Jan. 28, 1969 R. L. BREEDEN ET AL 3,424,870

MULTIFREQUENCY SIGNAL GENERATOR FOR TONE-DIALED TELEPHONES

Filed Sept 14, 1965 Sheet 1 of 2

INVENTORS R. L. BREEDEN
R. M. RICKERT
BY E J Olinder
ATTORNEY

Jan. 28, 1969 R. L. BREEDEN ETAL 3,424,870

MULTIFREQUENCY SIGNAL GENERATOR FOR TONE-DIALED TELEPHONES

Filed Sept. 14, 1965 Sheet 2 of 2

1

3,424,870
MULTIFREQUENCY SIGNAL GENERATOR FOR TONE-DIALED TELEPHONES

Robert L. Breeden, West Lafayette, and Richard M. Rickert, Indianapolis, Ind., assignors to Bell Telephone Laboratories, Incorporated, New York, N.Y., a corporation of New York Filed Sept. 14, 1965, Ser. No. 487,138
U.S. Cl. 179—84 21 Claims
Int. Cl. H04m 1/26

ABSTRACT OF THE DISCLOSURE

This invention relates to multi-frequency signaling systems and more particularly to telephone signal generators that produce coincident pairs of oscillatory signal bursts to effect selection of a subscriber to be called. The method of energizing this generator is by a novel connection of a capacitator to the generator circuit to provide power for the generator circuit by its discharge.

Figure 1:
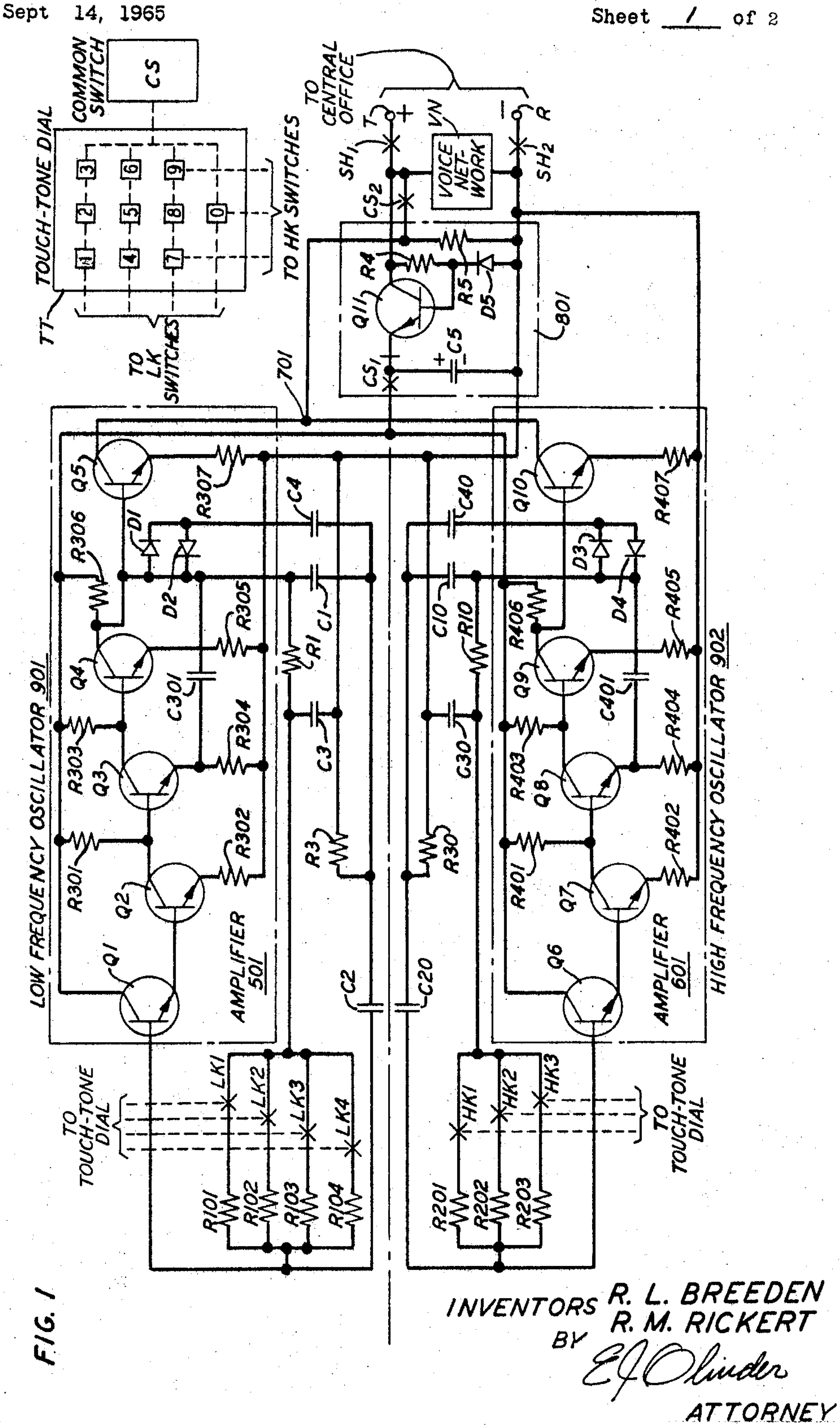

This invention relates to multifrequency signaling systems and more particularly to signal generators that produce coincident pairs of oscillatory signal bursts.

Multifrequency signal generators with the capability of producing unique coincident pairs of oscillatory signal bursts in response to the actuation of a manual pushbutton or the like are well known, as disclosed for example by L. A. Meacham and F. West in Patent 3,184,554, issued May 18, 1965.

One form of the arrangement shown by Meacham and West is employed commercially as a pushbutton operated dial for a telephone set now commonly known as a Touch-Tone ® telephone. Each signal pair generated by the dial of a Touch-Tone telephone includes one signal from a relatively high frequency band and one signal from a relatively low frequency band, and each unique combination is indicative of a dialed digit in accordance with a frequency code.

Typical multifrequency signal generator circuits, such as the pushbutton dial circuit in a Touch-Tone set, employ a single transistor oscillator with an inductively coupled feedback circuit. With the advent of integrated circuitry and thin film techniques, however, has come the realization that modern circuit technology of that type cannot be readily exploited in multifrequency signal generators owing to the need for inductive elements that still require a substantial portion of the available circuit packaging space. The desirability of reducing such space has been emphasized by the development of dial-in-handset telephones wherein the conventional telephone set base structure has been eliminated and the dial mechanism and circuitry are mounted in the handset.

Oscillators and amplifiers employing only resistive and capacitive circuit elements in the feedback loop are known as disclosed, for example, by R. L. Dietzold in Patent 2,549,065, issued Apr. 17, 1951. Multifrequency oscillators of this type have failed thus far, however, to meet all of the specific requirements needed to conform to the rigid standards of telephone signaling. One problem not heretofore fully solved relates to the need of means for readily shifting the oscillator from one frequency to another. Further, in known arrangements some difficulty has been found in eliminating interference between two oscillatory signal bursts of different frequencies when simultaneous generation is required. Additionally, prior art systems typically experience some degree of frequency shift, owing to unwanted feedback signals that are applied through the biasing network.

Accordingly, one object of the invention is to facilitate

2 the generation of coincident multifrequency signals without the employment of inductive circuit elements.

Another object is to eliminate interference and interaction between two multifrequency signals that are generated simultaneously by interconnected oscillator networks.

Still another object is to avoid interference from unwanted feedback in a common bias network that serves two interconnected transistor oscillators that are required simultaneously to generate oscillatory bursts of different frequencies.

These and other objects are attained in accordance with the principles of the invention in one illustrative embodiment that employs a uniquely interconnected pair of multistage transistor oscillators each utilizing a respective feedback path that includes only resistive and capacitive circuit elements arranged in a notch filter network configuration. Effective control over output signal amplitude is provided by the use of two pairs of amplitude limiting diodes, each pair being connected in a respective one of the twin-T notch filter feedback networks. Frequency selection is provided by a combination of resistive elements in each of the feedback networks, means being provided for selectively switching each of the elements into the circuit in accordance with the frequency to be generated. Frequency shift from feedback signals in the power supply circuit that occur in the output signals of some conventional circuits is avoided in accordance with the invention by powering the oscillator transistors solely from the stored energy of a capacitor that is charged through a unique transistor-diode combination.

Accordingly, one feature of the invention deals with a uniquely interconnected pair of multistage transistors oscillators, each employing twin-T, R-C notch filters in the feedback path in combination with means for selectively determining the frequency of each of a pair of coincident signal bursts generated by the oscillators.

Another feature involves an oscillator limiting circuit that employs two back-to-back, parallel connected diodes in the R-C twin-T filter feedback network of a transistor oscillator. Amplitude control over the output signals is thus achieved by controlling the amount of attenuation provided by the notch filters rather than by limiting the gain of the amplifiers by loading as in conventional practice.

An additional feature of the invention pertains to a common power supply circuit for a pair of transistor oscillators that utilizes the stored energy of a capacitor charged by a transistor-diode charging circuit.

Figure 2:
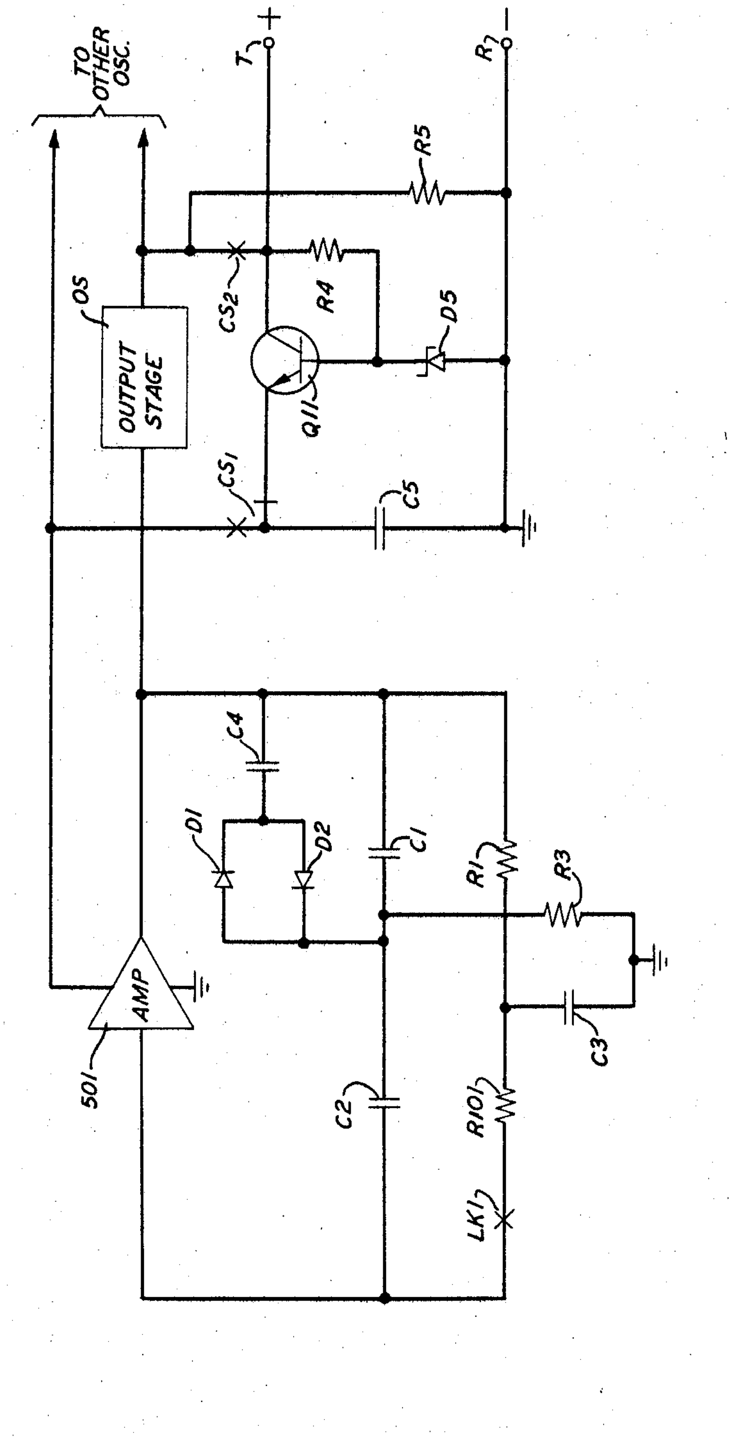

The principles of the invention together with additional objects and features thereof will be fully apprehended from the following detailed description of an illustrative embodiment and from the drawing in which:

FIG. 1 is a schematic circuit diagram of a multifrequency signal generator in accordance with the invention; and FIG. 2 is a simplified version of the circuit shown in FIG. 1 drawn to emphasize certain of the features thereof.

The multifrequency generator of FIG. 1 may be employed with particular advantage in any signal generating arrangement where circuit packaging space is extremely limited. For example, the circuit may be readily utilized as a telephone dial signal generating circuit in a dial-in-handset telephone of the type shown in Design Patent 190,810, issued to Henry Dreyfuss and Robert H. Hose on July 4, 1961.

In order to illustrate fully the adaptability of the circuit for use as a telephone dial signal generating circuit, its combination with a Touch-Tone or pushbutton dial TT is shown.

*Circuit description*

The circuit proper comprises a pair of multistage transistor amplifiers 501 and 601. Amplifier 501 includes four transistors, Q1 through Q4, with direct emitter-to-base coupling and an output transistor Q5. Similarly, amplifier 601 includes transistors Q6 through Q9 with direct emitter-to-base coupling and an output transistor Q10. Conventional bias fixing functions are provided by resistors R301 through R306 in amplifier 501 and by resistors R401 through R406 in amplifier 601. Resistors R307 and R407 establish a biasing level on the emitters of the respective output transistors and also provide gain control.

In amplifier 501 positive or regenerative feedback is provided by way of a twin-T notch filter network that includes capacitors C1 and C2, shunted by resistor R3 as the first T, and resistor R1 and a selected one of the resistors R101 through R104, shunted by capacitor C3 as the second T. The configuration of the twin-T filter is shown in a somewhat simplified form in FIG. 2. In a filter of the type shown, comprising a high pass T section of the RC type parallel connected with an RC low pass T section, signals of a particular frequency are attenuated to a maximum degree, and adjacent frequencies are attenuated to a lesser degree thereby forming a "notch" in the plot of the frequency spectrum. As is well known, such filters are particularly useful as a means for providing positive or regenerative feedback in an oscillator, owing to the 180° phase shaft that occurs for a signal oscillating at the notch frequency and further, owing to the fact that signals only slightly off the notch markedly depart from this phase shift. Consequently, in the feedback loop of an oscillator whose amplifier has shifted the phase by 180° from the input to the output, an additional 180° phase shift produces regenerative feedback at the notch frequency and the sharp phase departure at other frequencies serves to suppress the non-notch frequencies.

Notch filters are particularly suitable for tuning oscillators that generate only one narrow frequency band. To operate at several frequencies with equal selectivity, an oscillator requires a circuit that exhibits a common phase departure effect at each frequency. This requirement is met, in accordance with the invention, by providing tuning elements in the feedback loop. These elements include a first bank of resistors, R101 through R104, for oscillator 901 and a second bank of resistors, R201 through R203, for oscillator 902. Each of these resistors in the two groups may be selectively switched into a corresponding one of the oscillator circuits to establish the frequency desired. In accordance with the invention, the switching function is performed by a pushbutton dial TT. Each one of the pushbuttons in dial TT operates one of the make contacts LK1 through LK4 and one of the make contacts HK1 through HK3 in accordance with the well-known 3×4 code. Thus, it is seen, that the operation of any of the dial pushbuttons effectively tunes the low frequency oscillator 901 to one frequency and simultaneously tunes the high frequency oscillator 902 to a second frequency.

As shown with particular clarity in FIG. 2, additional elements have been added, in accordance with the invention, to the conventional twin-T notch filter network. These additional elements are diodes D1 and D2, connected in parallel relation and oppositely poled, which, together with capacitor C4, are connected in shunt with capacitor C1. Capacitor C4 is a blocking capacitor, and diodes D1 and D2 uniquely provide a limiting function on the output of amplifier 501. This limiting function is explained in detail below in the section headed Circuit Operation. As shown in FIG. 1, diodes D3 and D4 and capacitor C40 are connected in oscillator 902 in a circuit configuration that corresponds to the connection of diodes D1 and D2 and capacitor C4 in oscillator 901.

The collector outputs of output transistors Q5 and Q10 are connected to tip lead T of the telephone line by way of a path that includes terminal 701 and make contact $CS_2$. The CS contacts are operated by the common switch CS, which is operatively responsive to the depression of any of the pushbuttons of dial TT. A conventional telephone voice network VN is bridged across tip and ring leads T and R. Also bridged across leads T and R is a bias control network 801 which comprises capacitor C5, transistor Q11, resistor R4 and diode D5. In accordance with the invention, bias network 801 uniquely provides a common source of biasing potential for the transistors of both amplifiers 501 and 601. The details of the biasing function are explained in the section that follows.

*Circuit operation*

When the telephone receiver, not shown, is lifted from its cradle, switchhook contacts $SH_1$ and $SH_2$ close, connecting tip lead T and ring lead R to the positive and negative sides, respectively, of the telephone line. This connection immediately charges capacitor C5 which is bridged across the line. Transistor Q11, its biasing diode D5 and capacitor C5 present a relatively high impedance across the line so long as capacitor C5 remains fully charged. With capacitor C5 charged, the circuit is in readiness for dialing.

The dialing process may be explained best in terms of a specific example. For instance, dialing the digit 1 closes make contact LK1 to introduce resistor R101 into the twin-T notch filter feedback network of low frequency oscillator 901 and also operates make contact HK1 to connect resistor R201 into the corresponding network of high frequency oscillator 902. A demand for two frequencies, such as 697 c.p.s. and 1209 c.p.s., is thus established, which combination is indicative of the digit 1 in terms of the 3×4 frequency code.

The depression of the digit 1 pushbutton also operates common switch CS, operating make contact $CS_2$ and transfer contacts $CS_1$ to connect the output stages of oscillators 901 and 902 to the telephone line and also to transfer capacitor C5 from the emitter circuit of transistor Q11 to the power supply leads of the first four stages of each of the oscillators 901 and 902. Each of the oscillator stages is thus powered by the stored energy in capacitor C5. Employing the decaying potential of capacitor C5 as a bias source is fully compatible with an oscillator operating in accordance with the principles of the invention, inasmuch as it serves to accentuate the plucked reed effect of the generated tones.

When the depressed button on dial TT is released, the oscillator outputs are disconnected from the telephone line by the opening of make contacts $CS_2$, and capacitor C5 is transferred from the transistor power supply leads of the oscillators to the emitter circuit of transistor Q11 for recharging. After each digit has been dialed, capacitor C5 is almost completely discharged.

In order to recharge capacitor C5 quickly before another digit is dialed, a low impedance in series with the charging voltage is required. It is evident that a low impedance constantly shunting a telephone line would greatly reduce the communication efficiency of the circuit. Consequently, a fixed low resistance in series with capacitor C5 is not acceptable. This problem is met, in accordance with the invention, by the utilization of a Zener diode D5 that breaks down at a voltage on the order of 5 volts, for example. So long as capacitor C5 remains fully charged, the base emitter junction of transistor Q11 is biased at a very low level, and biasing circuit 801 behaves like a very high impedance shunting the telephone line. When capacitor C5 is switched back into the emitter circuit of transistor Q11 in the manner indicated, however, a heavy current starts to flow through the collector-emitter path, owing to the relatively heavy forward biasing that is placed on the base whenever the emitter falls much below the breakdown voltage of diode D5. As soon as capacitor C5 is charged, the circuit once again presents a high impedance to the telephone line.

A particular advantage inherent in a bias supply circuit having a configuration in accordance with the principles of the invention, stems from the fact that a major source of oscillator frequency shift typically present in conventional oscillators is eliminated. It is well known that a conventional power supply filter circuit cannot be economically designed to attenuate the output of an oscillator sufficiently to prevent some portion of the signal from leaking back through the filter. A degree of frequency shift usually results. In accordance with the invention, however, the critical parts of the oscillator circuits are disconnected completely from the telephone line and from the oscillator output signals present there, and, accordingly, it is not possible for signals to be fed back through the power supply.

When oscillators 901 and 902 are operating, amplitude limiting is uniquely provided in accordance with the invention of diodes D1 and D2 and by diodes D3 and D4, respectively. In the prior art, systems are known wherein limiting is provided by varying the resistance of an element such as resistor R3 in response to variations in the gain of the amplifier. Such arrangements, however, invariably result in some degree of phase shift at the notch frequency, or, stated otherwise, the position of the notch is in effect shifted slightly whenever limiting occurs.

In accordance with the invention, the limiting function is based on the characteristic reduction that occurs in the effective resistance of two parallel connected, oppositely poled, unbiased diodes as the amplitude of an applied alternating voltage is increased. It has been found that a limiting circuit connected in the manner shown has virtually no effect on the phase of signals generated at the notch frequency, irrespective of whether limiting occurs, and consequently the position of the notch in the frequency spectrum remains substantially fixed. This effect is believed to stem, in part, from the fact that the parameters of each of the six conventional elements in the twin-T notch filter remain fixed, whereas in the prior art the resistance magnitude of at least one of these elements was continuously varied whenever limiting took place. Each of the diode pairs D1, D2 and D3, D4 may be viewed as a single element which, in accordance with the invention, is connected in intimate circuit relation with a twin-T notch filter, in effect modifying the filter from a conventional six circuit element configuration to a seven element configuration.

It is to be understood that the embodiment described herein is merely illustrative of the principles of the invention. Various modifications thereto may be made by persons skilled in the art without departing from the spirit and scope of the invention.

What is claimed is:

1. A multifrequency signal generator comprising, in combination, first and second transistor oscillator circuits each including a respective feedback path having only resistive and capacitive circuit elements therein arranged in a notch filter configuration, means for introducing selective ones of said resistive elements into said notch filter thereby to provide frequency control, a common capacitive circuit element, means for charging said last named element, and means for employing the discharge of said last named element as a power supply for said transistor oscillator circuits.

2. An oscillatory signal generator comprising, in combination, an amplifier having an input point and an output point, a feedback path connecting said points, said path including a twin-T notch filter having resistive and capacitive circuit elements, and a limiter circuit shunting one of said capacitive elements, said limiter circuit including two asymmetrically conducting impedance devices oppositely poled in parallel circuit relation.

3. An oscillatory signal generator comprising, in combination, an amplifier having an input point and an output point; a positive feedback circuit connecting said points; said circuit comprising a first path including a first and a second capacitive circuit element in series relation, a first resistive element connected between a terminal common to said first and second capacitive elements and a reference potential, a second path including a second and a third resistive element in series relation, and a third capacitive element connected between a terminal common to said second and third resistive elements and said reference potential; and a limiter circuit shunting said first capacitive element, said limiter circuit comprising first and second diodes in parallel relation and oppositely poled.

4. An oscillatory signal generator comprising, in combination, an amplifier having an input point and an output point, a feedback circuit connected between said points comprising a pair of symmetrical T-networks in parallel relation, one of said networks including a pair of series connected resistive elements and a shunt capacitive element, the other of said networks including a pair of series connected capacitive elements and a shunt resistive element, said capacitive and resistive elements being proportioned to provide maximum attenuation and reversal of phase at a preselected frequency, amplitude limiting circuit means shunting one of said series connected capacitive elements comprising a pair of asymmetrically conducting impedance devices in parallel relation and oppositely poled and a capacitive element connected between said output point and said devices.

5. Apparatus in accordance with claim 4 including a plurality of resistive elements of different resistance magnitudes and means for selectively switching any one of said last named elements into said one of said networks in place of one of said pair of series connected resistive elements thereby to provide frequency selectivity for said generator.

6. A multifrequency signal generator for a telephone dial comprising, in combination, first and second transistor amplifiers each having a respective input point and a respective output point; a pair of feedback circuits each connected between a respective one of said output points and a respective one of said input points; each of said circuits comprising a pair of symmetrical T-networks in parallel relation; one of said networks in each of said pair of networks including a first resistive element in series, selectively, with any one of a respective plurality of second resistive elements and a shunt capacitive element; the other of said networks in each of said pair of networks including a pair of series connected capacitive elements and a shunt resistive element; a pair of amplitude limiting circuit means each shunting one of said pair of capacitive elements in a respective one of said other networks; each of said pair of circuit means comprising a pair of parallel connected, oppositely poled, asymmertically conducting impedance devices; a first and a second plurality of resistive elements; a telephone dial having a plurality of switch operating elements; common circuit means including a capacitive element for biasing said amplifiers; means for connecting said last named element across a telephone line; means responsive to the operation of any one of said switch operating elements for disconnecting said last named capacitive element from across said telephone line, for connecting said last named element to said amplifiers, thereby to employ said last named element as a bias source for said amplifiers, and for switching a respective one of said resistive elements in each of said pluralities of resistive elements into a respective one of said networks.

7. Multifrequency signal generating apparatus for signaling over a telephone line comprising, in combination, first and second transistor oscillator circuits each tunable to any one of a respective group of frequencies, a capacitive circuit element connectable across said telephone line, a dial comprising digit representing pushbuttons, means responsive to the operation of any one of said pushbuttons for substantially simultaneously disconnecting one terminal of said element from one side of said line, for connecting said element to said amplifiers, whereby the discharge of said element biases said circuits, and for tuning each of said circuits to a respective one of said frequencies indicative of a number dialed in terms of a preselected frequency code.

8. Multifrequency signal generating apparatus for signaling over a telephone line comprising, in combination, telephone line terminals, a transistor having base, emitter and collector electrodes, a capacitive circuit element, a circuit path for charging said capacitor upon the connection of said terminals to said telephone line, said path including the collector-emitter path of said transistor, transistor oscillator means for generating a coincident pair of oscillatory signal bursts indicative of a dialed digit in terms of a frequency code, dialing means, means responsive to the operation of said dialing means for tuning said oscillator to a frequency pair indicative of a dialed digit, for disconnecting said capacitive circuit element from said circuit path and for connecting said circuit element to said oscillator means, whereupon the discharge from said circuit element is utilized to bias said transistor oscillator means.

9. Apparatus in accordance with claim 8 including an asymmetrically conducting impedance element connected between one terminal of said capacitive element and said base electrode of said transistor.

10. Apparatus in accordance with claim 8 including a Zener diode connected between one terminal of said capacitive element and said base electrode of said transistor.

11. A telephone set comprising, in combination, switchhook means for connecting said set to a telephone line; transistor oscillator means for generating coincident pairs of oscillatory signal bursts indicative of dialed digits; a capacitive circuit element; means responsive to the operation of said switchhook means for charging said capacitive element from said telephone line; said charging means including a transistor having a collector electrode connectable to one side of said telephone line, an emitter electrode normally connected to one terminal of said capacitive element, a diode having one terminal connected to the base of said transistor, the other terminal of said capacitive element and the other terminal of said diode being connected to the other side of said telephone line; and dialing means responsive to the dialing of a digit for tuning said oscillator means to each of two frequencies indicative of the digit dialed, for disconnecting said one terminal of said capacitive element from said emitter of said transistor and for connecting said one terminal of said capacitive element to said transistor oscillator, whereupon said capacitive element discharges to bias said transistor oscillator.

12. Apparatus in accordance with claim 11 wherein said oscillator means comprises first and second transistor amplifier circuits each having a respective regenerative feedback circuit, each of said feedback circuits including a respective twin-T notch filter comprising only resistive and capacitive circuit elements, first and second groups of resistive elements each corresponding to a respective one of said filters, each of said last named resistive elements being connectable in a respective one of said filters thereby to determine the output frequency of a corresponding one of said oscillators, said tuning of said oscillator comprising the connecting of each of a pair of said resistive elements from said groups into a corresponding one of said filters.

13. Telephone signal generating apparatus for signaling over a telephone line comprising, in combination, oscillator means, including an output point, responsive to the application of a bias voltage for generating oscillatory signal bursts; a capacitive circuit element; means responsive to the connection of said element across a telephone line for charging said element; a telephone dial; multifunction means responsive to the operation of said dial for disconnecting said element from across said line, for tuning said oscillator means to a pair of frequencies indicative of the digit dialed, for connecting said output point to said telephone line, and for connecting said circuit element to said oscillator means, whereupon said element discharges to provide a bias voltage to said oscillator means.

14. Apparatus in accordance with claim 13 wherein said dial comprises a pushbutton array.

15. Apparatus in accordance with claim 13 wherein said oscillator means comprises a pair of transistor oscillator circuits having said output point in common, wherein each of said oscillator circuits includes a respective regenerative feedback path including only resistive and capacitive elements, first and second groups of resistive elements, and wherein said tuning portion of said multifunction means comprises switch means for connecting one of said resistive elements from said first group into one of said feedback paths and one of said resistive elements from said second group into the other of said feedback paths.

16. Signal generating apparatus for signaling over a telephone line comprising, in combination, oscillator circuit means having a signal output point and a power input point; a capacitive circuit element connectable across said telephone line; means responsive to the connection of said apparatus to said telephone line for charging said element; a telephone dial; means responsive to the dialing of a digit with said dial for disconnecting said element from one side of said telephone line, for connecting said element to said input point, whereupon said element discharges, and for connecting said output point to said line.

17. Signal generating apparatus for signaling over a telephone line, comprising, in combination, oscillator circuit means having a power input point and a signal output point; switchhook means for connecting said apparatus to said telephone line; circuit means, normally connected across said telephone line upon the operation of said switchhook means, for storing electrical power derived from said line, said circuit means providing a relatively high impedance across said line when in the storing or charged condition; dialing means; multifunction switching means responsive to the operation of said dialing means for tuning said oscillator circuit to a frequency pattern indicative of the digit dialed, for disconnecting said circuit means from at least one side of said telephone line, for connecting said circuit means to said oscillator circuit, whereupon said circuit means discharges to provide power for the operation of said oscillator circuit, and for connecting said output point to said line.

18. Apparatus in accordance with claim 17 wherein said circuit means comprises a capacitive circuit element normally bridged across said line, a transistor having base, collector and emitter electrodes, the emitter-collector path of said transistor being connected in series relation with one side of said telephone line, means responsive to the condition of charge of said capacitive circuit element for controlling the bias on said transistor whereby said circuit presents a relatively high impedance across said line when said element is in the charged condition and a relatively low impedance across said line when said element is in an uncharged condition.

19. Apparatus in accordance with claim 18 wherein said controlling means comprises a diode connected between said base electrode of said transistor and one side of said line.

20. Signal generating apparatus for signaling on a telephone line comprising, in combination, a pair of terminal leads, switchhook means for connecting said leads to a telephone line, circuit means for storing an electrical charge derived from said line connected across said leads, said storing means presenting a relatively high impedance across said leads when in the stored condition and a relatively low impedance when in the unstored condition, a dual frequency oscillator circuit, dial means, means responsive to the operation of said dial means for tuning said oscillator to a frequency combination indicative of the digit dialed, disconnecting a portion of said circuit means from one of said leads, connecting said portion to said oscillator circuit whereupon the stored charge is applied to bias said oscillator circuit, and for connecting the output of said oscillator circuit to one of said terminal leads for subsequent application to said line.

21. A multifrequency signal generator circuit comprising, in combination, first and second transistor oscillator circuits each including a respective regenerative feedback path having only resistive and capacitive circuit elements therein arranged in notch filter configuration; means for connecting only selective ones of said resistive elements into each of said paths thereby to provide frequency selectivity; first and second pairs of parallel connected, oppositely poled, asymmetrically conducting impedance devices, each of said pairs shunting one of said capacitive elements in a respective one of said feedback paths thereby to provide amplitude limiting for said oscillator circuits; a common capacitive circuit element; means for charging said last named element; and means for employing the discharge of said last named element as a power supply for said oscillator circuits.

References Cited

UNITED STATES PATENTS 2,827,569 3/1958 Jessen et al.

KATHLEEN H. CLAFFY, *Primary Examiner.*

JAN S. BLACK, *Assistant Examiner.*